US012615705B2

(12) United States Patent
Gelbart

(10) Patent No.: US 12,615,705 B2
(45) Date of Patent: Apr. 28, 2026

(54) BEAMLINE ISOLATION WINDOW FOR A PARTICLE ACCELERATOR

(71) Applicant: ISOSOLUTIONS MARKETING & MANAGEMENT INC., Vancouver (CA)

(72) Inventor: William Zeev Gelbart, Vancouver (CA)

( * ) Notice: Subject to any disclaimer, the term of this patent is extended or adjusted under 35 U.S.C. 154(b) by 822 days.

(21) Appl. No.: 17/749,750

(22) Filed: May 20, 2022

(65) Prior Publication Data

US 2022/0377872 A1 Nov. 24, 2022

Related U.S. Application Data

(60) Provisional application No. 63/191,163, filed on May 20, 2021.

(51) Int. Cl.
*H05H 7/12* (2006.01)

(52) U.S. Cl.
CPC .................................... *H05H 7/12* (2013.01)

(58) Field of Classification Search
CPC ....... H05H 7/12; H05H 6/00; H05H 2006/002
USPC ....... 250/396 R, 492.1, 492.3; 376/190, 195, 376/166, 194
See application file for complete search history.

(56) References Cited

U.S. PATENT DOCUMENTS 5,659,223 A * 8/1997 Goodman ................ H05H 7/00 315/39
2006/0062342 A1 * 3/2006 Gonzalez Lepera .... G21G 1/10 376/195

* cited by examiner

*Primary Examiner* — Jason L Mccormack

(57) ABSTRACT

An apparatus and method for accelerator beam line isolation from targets and solid target irradiation chamber in the production of medical radioisotopes by the irradiation of solid targets is provided. The isolation consists of a single, thin material window placed in front of the target in such as way as not to be subjected to any pressure differences when the target irradiation chamber is evacuated or vented and not requiring window surface cooling, relaying only on the heat removal by conduction.

10 Claims, 14 Drawing Sheets

BEAMLINE ISOLATION WINDOW FOR A PARTICLE ACCELERATOR

CROSS REFERENCE TO RELATED APPLICATION

The present invention claims priority to U.S. Provisional Application Ser. No. 63/191,163, filed May 20, 2021.

FIELD OF THE INVENTION

The invention generally relates to the field of particle accelerators, and more particularly to the systems for irradiating solid elements to produce radionuclides.

BACKGROUND

Radioactive elements have been used in medicine since the discovery of Radium-226 by Marie and Pierre Curie in 1898. One such application of radioactive elements in the $20^{th}$ and $21^{st}$ century is in medical diagnostic imaging and therapy applications. Most medical radioactive elements currently used are cataloged in the IAEA publication "Medical Radioisotopes Production". The radioactive elements are created by bombarding a chemical element with energetic protons or particles thereby inducing a nuclear reaction resulting in the creation of the required radionuclide. The source of the particles used to bombard the element is a particle accelerator, which is in most installations a cyclotron. In all cases the acceleration of the particles takes place under high vacuum with pressures below $5\times10^{-6}$ torr and with the entire acceleration region of the accelerator enclosed in an evacuated chamber.

The precursor element of the radionuclide can be in gaseous, liquid or solid state. However, many precursors are typically solid elements (at least at above 20° C.) or their alloys, or solid state compounds of those elements: for example salts or oxides. To facilitate the handling of those solid materials the accepted practice is depositing a relatively thin layer (typically 0.01 mm to 0.5 mm) of those materials on a metallic substrate (usually on a copper or silver wafer or plate, but other materials may be used as well), together forming what is known as a "solid target". By the target material being clad on or attached to a substrate the solid target can be handled and remotely manipulated when placed in a position for irradiation and when removed from the irradiation position to be transferred for the removal or dissolution of the target material from the substrate in order to separate the produced radionuclide. This is in contrast with gaseous or liquid (at least at above 20° C.) element targets, or targets where the material is held as bulk inside an enclosed cavity: for example low melting point materials that will liquefy at the irradiated temperature. Those targets are fixed in one position with only the liquid target material transported to and from the target cavity as a liquid or gas trough tubes.

Another form of targets are fully encapsulated targets that contain the solid or liquid target material encapsulated in a hermetic capsule that is manipulated in to the beam in a similar way as solid targets. The present invention is only relevant to solid targets consisting of a target material deposited on a target substrate.

In the majority of particle accelerators, the accelerated high energy particle beam is deflected or extracted from the accelerating region to be delivered to the target that is placed in an irradiation enclosure external to the accelerator. The integrity of the high vacuum must be maintained inside the accelerator as well as through the entire path of the particle beam trajectory up to and including the target. To maintain this integrity, the particle beam is delivered to the target irradiation enclosure through an evacuated pipe, known as a "beamline". During the target irradiation the target irradiation enclosure must as well be evacuated to a (low) pressure in the same range as the accelerator and the beam line pressure.

The beamline is typically a round pipe with the inside diameter of typically 25 mm to 250 mm and a length of typically 1 m to 10 m. The particle beam inside the beamline is often subjected to magnetic steering and focusing by electromagnets placed around and along the beamline. It is common as well to collimate the beam before it is reaching the target. The collimator consists of an aperture or of series of slits to shape (by shadowing) the beam to correspond to the target size. Since the collimation is achieved by absorbing a portion of the beam energy, the collimating elements are cooled (usually by internal water flow) to remove the heat generated by the absorbed portion of the beam. In many target irradiation systems the collimator is an integral part of the system and placed directly in front of the target.

A target with a coating of the target material is placed in the target irradiation enclosure before irradiation and removed from the target irradiation enclosure at the end of the irradiation (for the target material dissolution and processing). Those operations require the venting of the target irradiation enclosure to reach atmospheric pressure. To prevent the venting of the communicating with the target irradiation enclosure beam line—as well as the accelerator vacuum chamber—a valve isolating the target irradiation enclosure is provided. This valve is only opened once the target is in place ready for irradiation and the target irradiation enclosure evacuated. The valve must as well allow the free passage of the particle beam and is usually a gate valve of sufficient aperture size for the beam passage.

Most target materials deposited on the surface of the target substrate can be exposed directly to the beamline vacuum and to the incoming particle beam. However, some target materials can interfere with beamline vacuum as a result of the high vapor pressure of the target material or create a risk of contamination that can be created by the introduction of traces of the target material into the beamline and subsequently into the accelerator. This is especially dangerous in the case of naturally radioactive target materials. An example of a radioactive precursor target element in use is Radium-226 employed in the production of Actinium-225. Not only is radium radioactive with a half-life of 1600 years and any traces of it entering the beam line could cause catastrophic contamination, but radium is producing (decaying into) radioactive radon gas that must be trapped and not be allowed to enter the beamline or the accelerator vacuum tank.

To prevent the ingress of vapors or contaminants into the beamline a physical separation is required between the beamline and the target irradiation enclosure. This separating barrier must be vacuum tight but at the same time allow the passage of the beam particles with minimal attenuation.

The current practice is to introduce a metallic foil (called "window") between the target-enclosure and the beamline valve. The window separates the target irradiation enclosure from the beamline thus preventing any communication between those two. In this configuration the foil must be strong enough the resist the pressure difference between the evacuated beamline and the atmospheric pressure introduced by the vented target irradiation enclosure. As an example, with a typical window size of about 50 mm diameter the force acting on the window is 196 Newton. To resist this force a strong metallic foil of considerable thickness is required. The most common window materials used in this application are nickel or cobalt alloys (because of it high tensile strength at elevated temperatures, a commercial alloy of cobalt and nickel sold as Havar® is widely used) in the thickness range of 10 to 50 micrometers.

A relatively high atomic number materials like cobalt and nickel (cobalt Z=27 and nickel Z=28) and dense (both are about 8.9 g/cm$^3$) are attenuating the particle beam by absorbing a portion (can be as high as 10%) of the incoming energy. Not only is there a beam energy loss to the target, but the beam energy absorbed in the window is generating a considerable amount of heat in the window foil; with the poor thermal conductivity of the typically used window materials and the high energy and high current beams commonly encountered in medical cyclotrons (typically 30 MeV @ 1 mA, but can be more) the window foil will melt if the surface of the window foil is not cooled.

In current practice with any heat conduction from the window foil being negligible, the cooling of the window is by the cooling of the window surface cooling by a forced flow of gas. This is achieved by the introduction of a second window in front of the first and separated from it by a short distance, typically about 10 mm to 20 mm. Helium or other gas is circulated between the windows to cool both window surfaces. While this strategy helps to keep the foils temperatures below the wakening of the metal or below its melting point (but still often at 500° C. or more), it introduces yet an additional beam energy degradation in the second window and in the cooling gas.

The gas cooling system requires the presence of auxiliary equipment that consists of a gas storage container and usually includes a pump and a system and network for recalculating and cooling the recalculated gas. This complex equipment not only adds to the cost of the target irradiation system but also increases the whole system failure probability.

Another negative consequence is beam scattering as a result of collisions with the window material atoms. The degree of scattering is mostly related to the mass of the material in the beam path, and the atomic number of the window material. The scattering disperses the beam outside the normal beam envelope, delivering less beam power to the target and causing activation of the target irradiation enclosure. This unwanted activation has to decay to acceptable levels (set by the Nuclear Safety Commission of the jurisdiction) before any access to the irradiation area is allowed at the end of the target bombardment. The increased residual activity of the target irradiation enclosure and associated components of the irradiation apparatus is a serious consideration in the planning and operation of the radioisotopes production facility.

It must be noted that in addition to the application of beamline isolation with solid targets irradiation systems, target windows are widely used in liquid or gaseous targets. In a gas or liquid target at least one window is in contact with the target material to contain the liquid or gaseous materials, or a solid phase materials that can melt or evaporate during irradiation through the absorption of the energy of the beam, inside the target cavity as described in the U.S. Pat. No. 9,961,756 B2 titled "ISOTOPE PRODUCTION TARGET CHAMBER INCLUDING A CAVITY FORMED FROM A SINGLE SHEET OF METAL FOIL" which is hereby incorporated by reference in its entirety. Additional windows in front of it can be present to allow the cooling of the windows by a flow of coolant between them in a similar way as implemented in the present practice of the dual beamline isolation window. The operation of liquid or gaseous targets is completely different from the operation of solid targets as liquid or gaseous targets are not removed nor vented (and usually pressurized) and the only application of the window is to contain the liquid or gaseous materials inside the target cavity

SUMMARY OF THE INVENTION

Embodiments of beamline and target-enclosure isolation apparatus in commercial particle accelerators and various embodiments of the isolating apparatus are described.

The beam line isolating window comprising of a single thin, impermeable to air and gases material placed between the target enclosure (target chamber) and the beamline, thus creating an isolating barrier between the target chamber and the beam line.

In a further embodiment, the window can be made of a thin material in, for example, the range of 1 to 5 micrometers and constructed of material of a low specific gravity and low Z.

In another embodiment to create a conductive heat-sink in the periphery of the window to cool the window material by conducting the heat generated by the beam in the window to the heat-sink.

In another embodiment to form the cooling of the peripheral hat sink by direct liquid cooling or by indirect cooling through an intimate contact with a cooled surface.

In another embodiment, the positioning and placement of the window and heat-sink assembly into a planned or existing target irradiation system is demonstrated.

A further embodiment of the process for the beamline and target-enclosure isolation is the use of the isolating element as a purposeful beam absorber to degrade the beam energy in situations where lower beam energy is required.

A method for monitoring the window foil integrity by the measurement of the current generated through the passage of the particle beam through the window foil.

These and other features of the present invention will become readily apparent upon further review of the following specification and drawings.

DETAILED DESCRIPTION

The present disclosure relates to accelerator or/and beamline isolation from the solid target irradiation chamber. As described herein, embodiments of the isolation apparatus comprise of a single thin foil window placed upstream from the target. "Upstream" and "downstream" terms used here are in relation to the follow of the particle beam, with the source of the beam being upstream and the target downstream.

In a desired embodiment of this invention, for example, a thin foil window attached to the metal frame is placed between the beamline vacuum and the target enclosure. Being located upstream from the beamline valve it is at all times exposed to the beamline vacuum and is not subjected to any pressure difference. This is true with the beamline closed and the irradiation chamber vented, as well as with the irradiation chamber evacuated and the beam line opened.

Since there is no pressure difference and no force acting upon the window foil, the foil can be considerably thinner than the foils used in isolation windows placed between the beamline valve and the target irradiation chamber. And since no high tensile strength is needed, the window foil material can be chosen to minimize beam scattering (by, for example using material with low specific density and/or low atomic number).

Advantageously, in the desirable embodiment of this invention, the window material used can be of high thermal conductivity (unlike most of the high tensile strength materials that have low thermal conductivity) thus eliminating any need for a double window with gas cooling, with the thermal conduction to the foil supporting frame being adequate.

Figure 1:
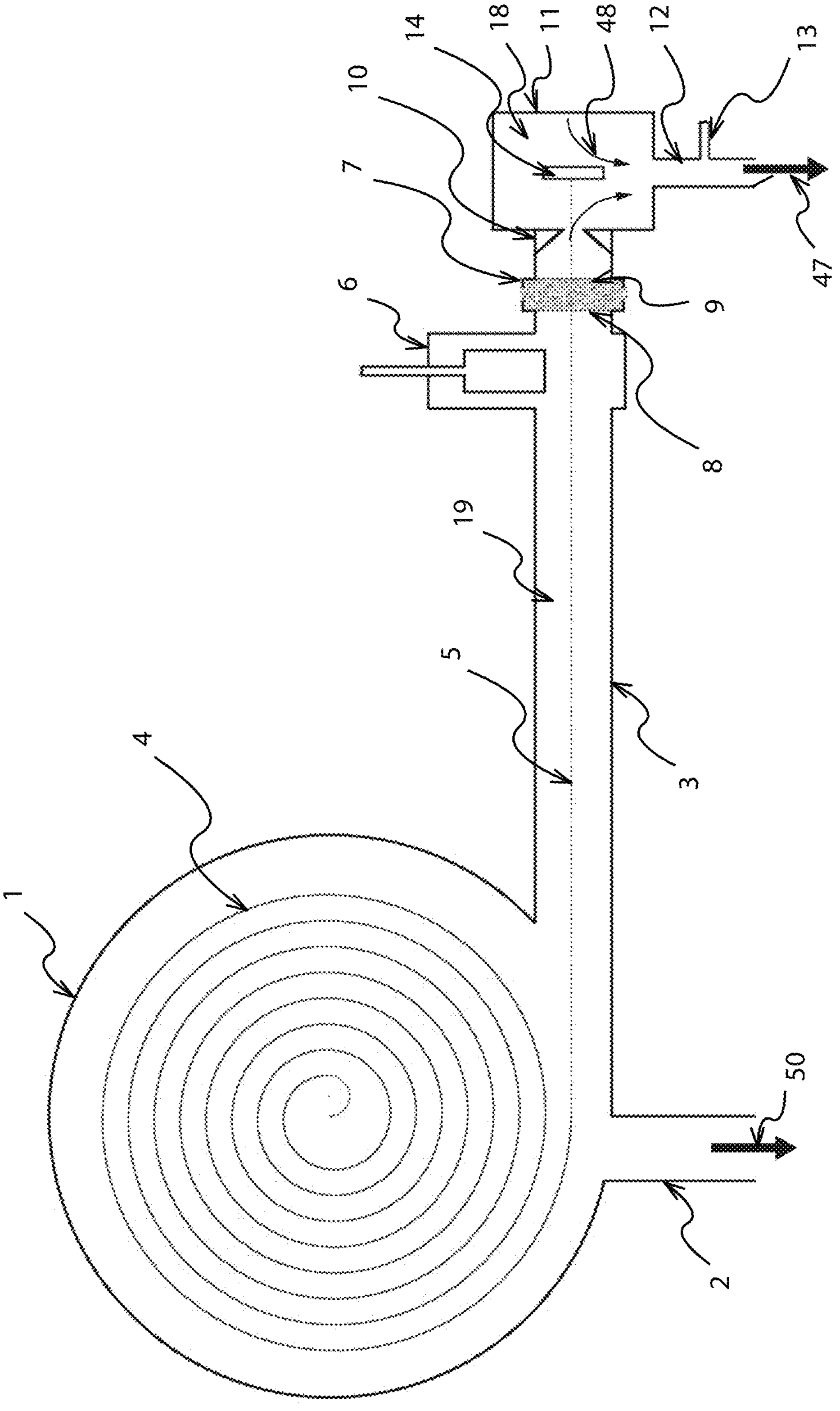
FIG. 1 PRIOR ART
FIG. 1 illustrates prior art where the cyclotron, the beam line, the beam line valve (open), the separation windows and the evacuated target irradiation chamber as used currently in typical solid target irradiation systems and equipment.

Referring now to FIG. 1, the beamline isolation strategy, such as disclosed in the Proceedings of IPAC2017, Copenhagen, Denmark: Turn-Key Beam lines for the 15-30 Mev Medical Cyclotron at Vecc, Christian Glarbo Pedersen et al, AND in Applied Radiation and Isotopes 94: A solid target system with remote handling of irradiated targets for PET cyclotrons, J. Siikanen et al, incorporated herein by reference in its entirety, as used for the irradiation of solid materials, is shown. This schematic view shows the irradiation stage with the beamline (3) and the accelerator vacuum tank (1) evacuated. The exemplary isolation module (7) constructed out of two gas cooled windows (8 and 9) is placed downstream from the open beamline valve (6) and in front of the irradiation chamber (11). The module (7) is schematically shown as filled with the cooling gas. This force acting upon the windows is created by the pressure difference between the pressurized interior of (7) and the evacuated volumes (19) on the beam line side and the evacuated volume (18) of the irradiation chamber.

Shown as well is a schematic view of a typical layout of the accelerator with the accelerator (represented schematically as cyclotron) vacuum chamber (1) equipped with a pumping port (2) for the evacuation of the vacuum chamber. The accelerator vacuum tank as well as the beamline are constantly pumped through the pumping port with the evacuated gas flow shown as (50). The internal, accelerated beam (4) is extracted or deflected (5) into the beam line pipe (3). Typical construction of the irradiation chamber (11) includes a pumping port (12) for the evacuation of the irradiation chamber, and a venting port (13) for the venting of the irradiation chamber to bring it to atmospheric pressure needed to access the target (14) for insertion and removal. The beam collimator (10) is shown schematically as a conical aperture placed in front of the target.

Figure 2:
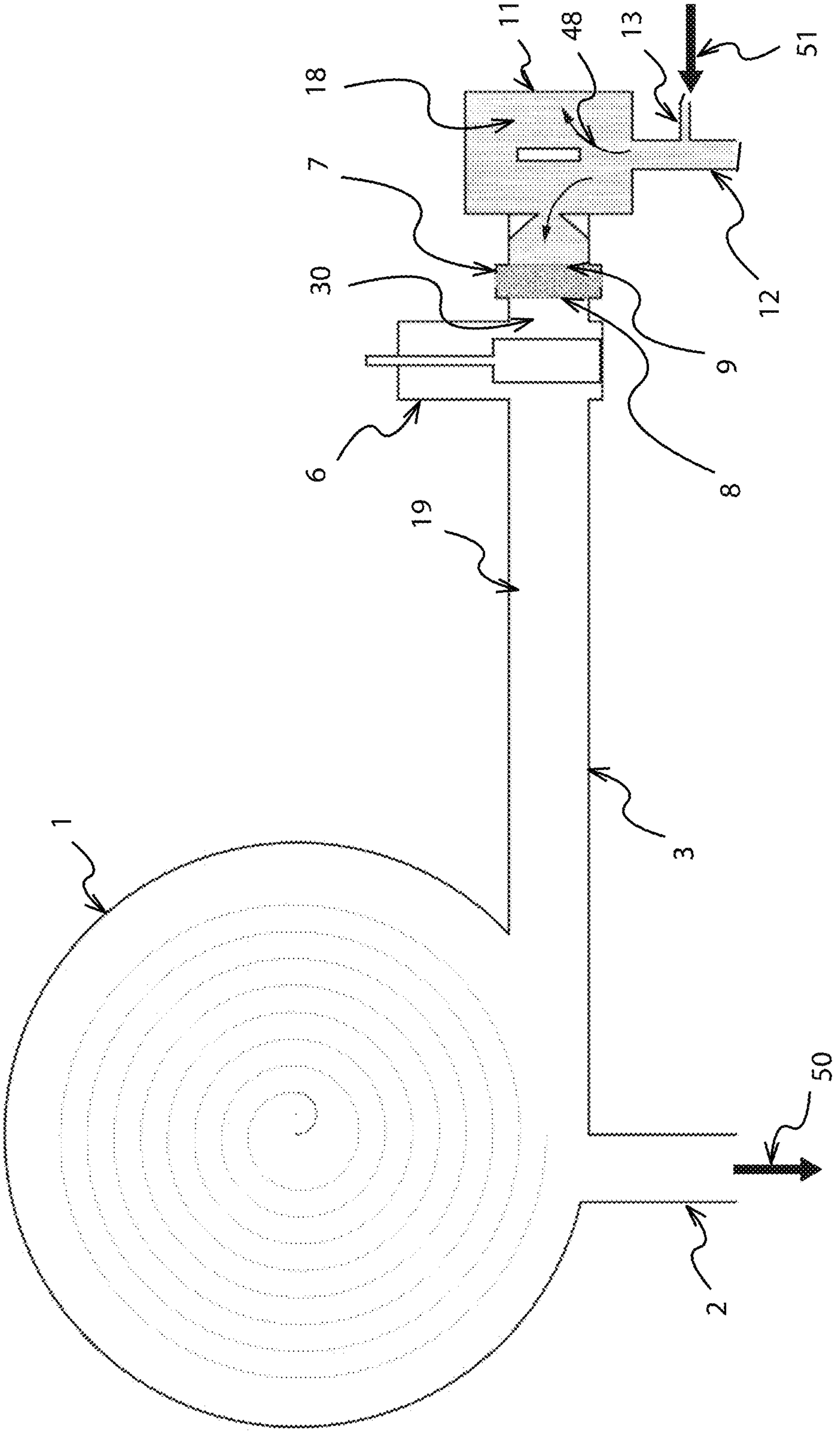
FIG. 2 PRIOR ART
FIG. 2 illustrates in prior art where the cyclotron, the beamline, the beamline valve (closed), the separation windows and the vented target irradiation chamber as used currently in typical solid target irradiation systems and equipment.

FIG. 2 is the same schematic view as in FIG. 1, but with no extracted beam at the end of the target irradiation and with the closed beam line valve (6) and the irradiation chamber (11) vented through the venting port (13) and being filled with the venting air or gas (51) at atmospheric pressure. The flow of the venting gas is shown as arrows (48). The accelerator vacuum tank (1) and the beam line (3) are still evacuated to maintain the vacuum. The small volume (30) between the closed beamline valve and the window (8) is left evacuated once the beam line valve is closed.

Figure 3:
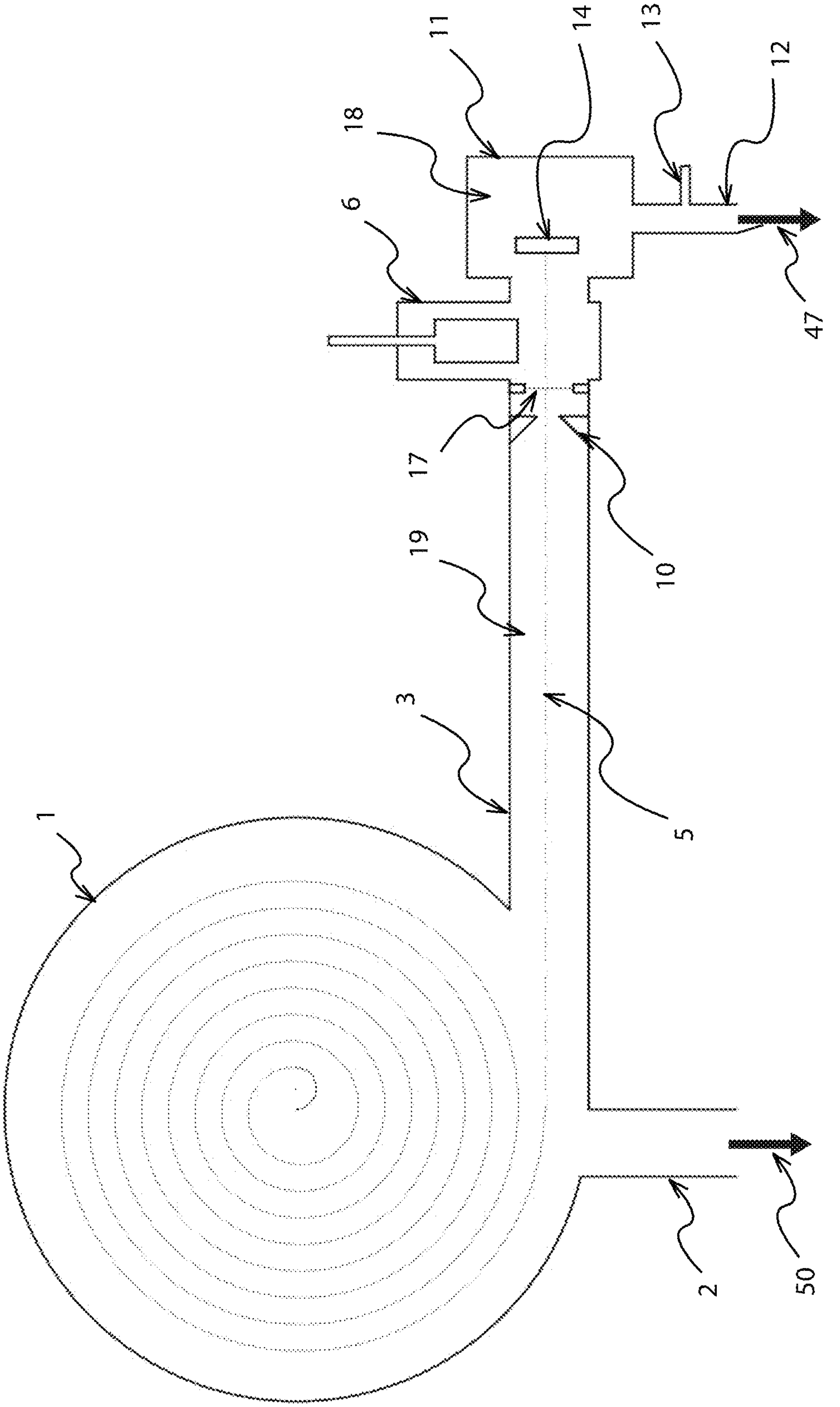
FIG. 3 illustrates the cyclotron, the beamline, the beamline valve (open) and the separation windows and the evacuated target irradiation chamber according to the present invention.

FIG. 3 is a schematic view of the situation as in FIG. 1, but showing the isolation window according to the present invention. This schematic view shows an irradiation stage with the beam (5) extracted into the beam line (3) and impending on the solid target (14). The isolation window comprising of a single, thin foil (17) is mounted in a holder upstream from the open beamline valve (6). The irradiation chamber (11) is evacuated through the pumping port (12) and the same, low pressure (vacuum) is present on both sides of the isolation window. Because of the minimal scattering of the beam by the window, the collimator (10) can now be placed further away from the target.

Figure 4:
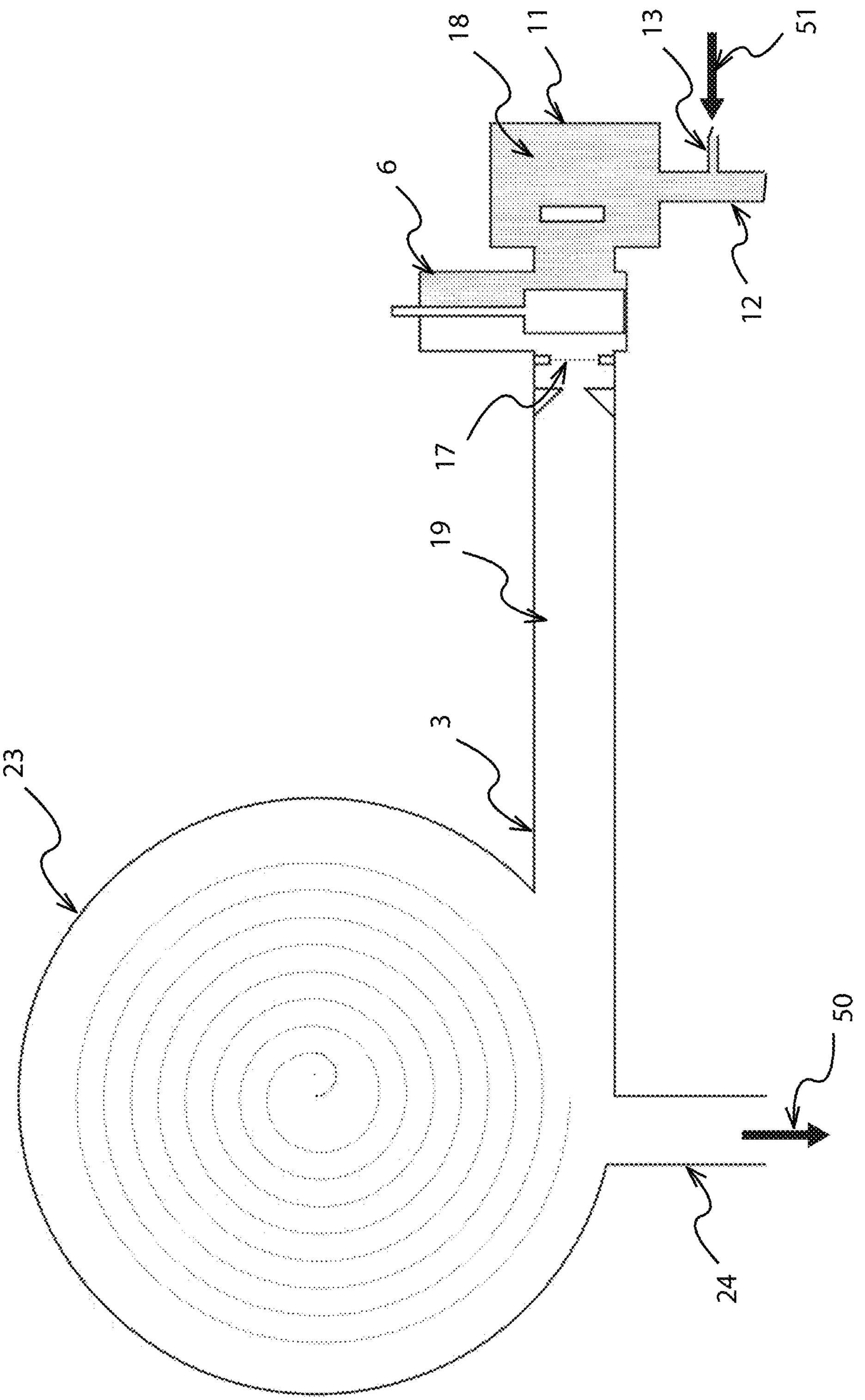
FIG. 4 illustrates the cyclotron, the beamline, the beamline valve (closed) and the separation windows and the vented target irradiation chamber according to the present invention.

FIG. 4 is the same schematic view as in FIG. 3 showing the isolation window according to the present invention, but with no extracted beam (end of the target irradiation) and with the beamline valve (15) closed, the irradiation chamber (11) vented through the venting port (13) and the chamber volume (18) filled with the venting air or gas (51) at atmospheric pressure. The isolation window is still inside the vacuum of the beamline with the same, low pressure present on both sides of the isolation window foil and force acting upon it.

Figure 5:
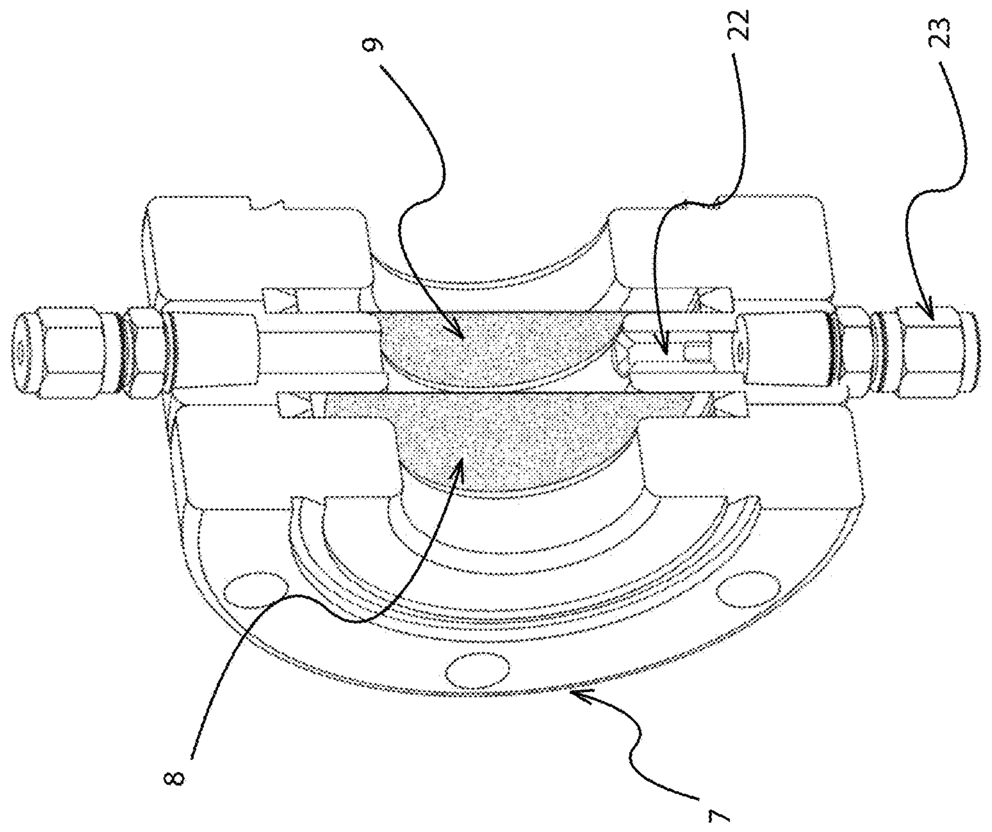
FIG. 5 PRIOR ART
FIG. 5 illustrates in prior art with a typical double window arrangement as currently used in typical solid target irradiation systems and equipment.

In an exemplary view in FIG. 5 of the dual, gas cooled isolation window such as disclosed in the disclosed in the Proceedings of IPAC2017, Copenhagen, Denmark: Turn-Key Beamlines for the 15-30 Mev Medical Cyclotron at Vecc, Christian Glarbo Pedersen et al, AND in Applied Radiation and Isotopes 94: A solid target system with remote handling of irradiated targets for PET cyclotrons, J. Siikanen et al, is shown in FIG. 5. The dual high strength window foils (8 and 9) are held in and attached to holder (7). The cooling gas is typically injected through the gas fitting (23) and its flow directed at the windows surfaces by the nozzle (22), but can be as well injected directly trough a single or plural ports. The whole assembly is vacuum tight and placed downstream, usually inserted directly between the beamline valve and the irradiation chamber and collimator, or in some instances forming an integral part of the target chamber.

Figure 7:
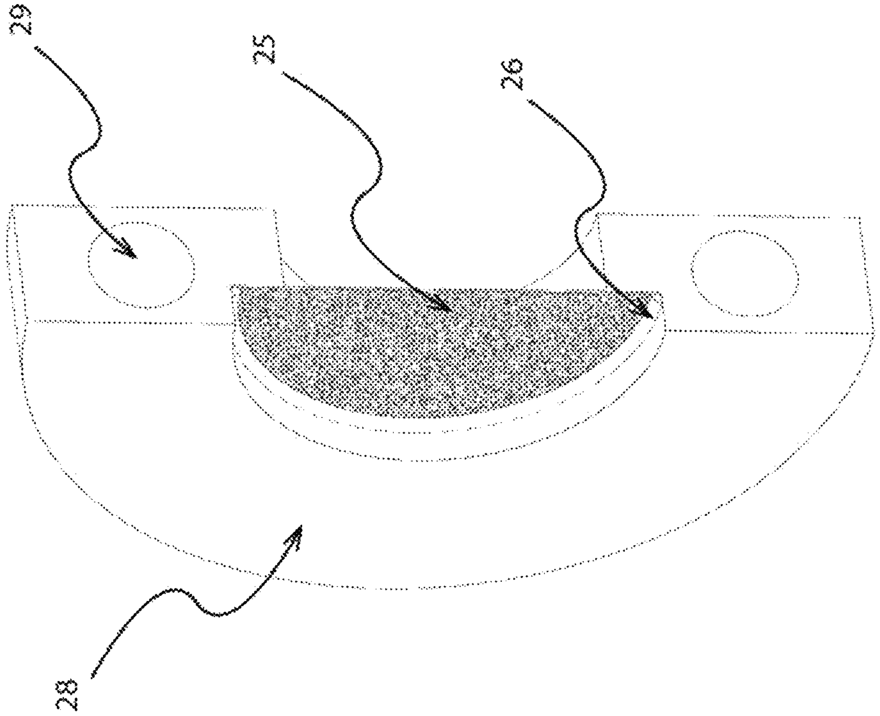
FIG. 6 and FIG. 7 illustrate the construction and assembly of the single foil separation window according to the present invention.
Figure 6:
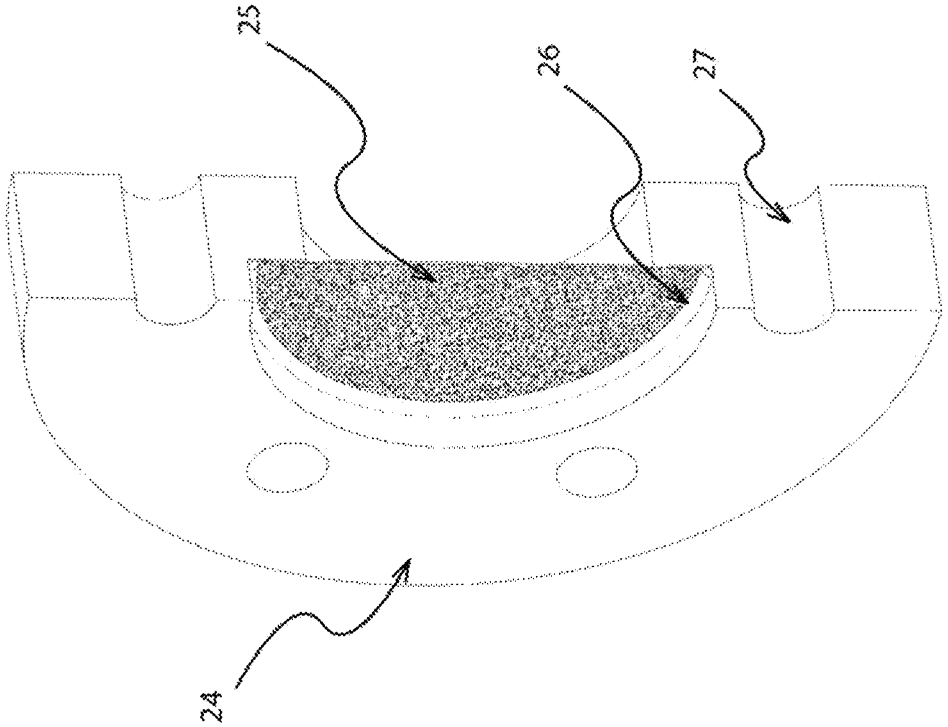

In exemplary embodiments, such the isolation window in (17), FIG. 6 and FIG. 7 showing possible construction of the isolation window assembly according to the present invention. In FIG. 6 the window foil (25) is mounted in a holder (24). The purpose of the holder is to hold and support the window foil and to provide a heat-sink for the heat generated in the foil by the intercepted portion of the particle beam passing through it. The foil is bound to the holder by soldering, welding or other bonding technique, with the fillet of the bonding material (if bonding material is used) shown as (26). The holder is featuring plural holes to accommodate fasteners that allow the frame and window foil assembly to be fastened to an existing or specially provided anchoring surface. Though the number of fasteners has been described as being six, it is to be understood that any number of fasteners may be utilized. In particle the mounting of the holder can be for example the back of the water cooled collimator body with the heat from the frame being conducted to the cooled surface.

FIG. 7 shows the same construction, but in the case where the holder is not attached to a cooled surface or if the cooling by this surface is not adequate. In this case the holder can be cooled by an integral or attached to it cooling channel (29) with a coolant flowing in the channel.

Since the only requirement of the window foil material is to be impervious to gas, the best choice is thin, low mass and low atomic number material possessing good thermal conductivity; however in some instances other material qualities can be more important in a specific application. Aluminum with specific gravity of 2.7 g/cm3, Z=13 and thermal conductivity of 237 $W \cdot m^{-1} \cdot K^{-1}$ can be used. Aluminum foil 2μ to 3μ thick is self supporting and can be welded or swaged into the holder. Another good candidate can be pyrolytic carbon with specific gravity of ~1.4 g/cm3, Z=6 and thermal conductivity of over 1000 $W \cdot m^{-1} \cdot K^{-1}$ (parallel to the deposition plane). Thin foils in the range of 2μ to 5μ thick are self supporting and impervious to gases. Pyrolytic carbon can be soldered (by electroplating the window periphery with copper) to the holder thus providing very good thermal conduction to the holder. The heat generated is conducted through the deposition planes parallel to the surface and removed at the edges by the cooled holder. Other forms of carbon have similar or sometimes even better specifications and can be used as well.

The holder (24) in FIG. 6 and FIG. 7 is best made of a high thermal conductivity material. Aluminum, copper or silver are good choices, but other materials can be used as well. When attached to a cooled surface, a high thermally conductivity interface, for example thermal paste or soft metallic foil, can be applied to the joint to assist in the heat conduction.

Figure 8:
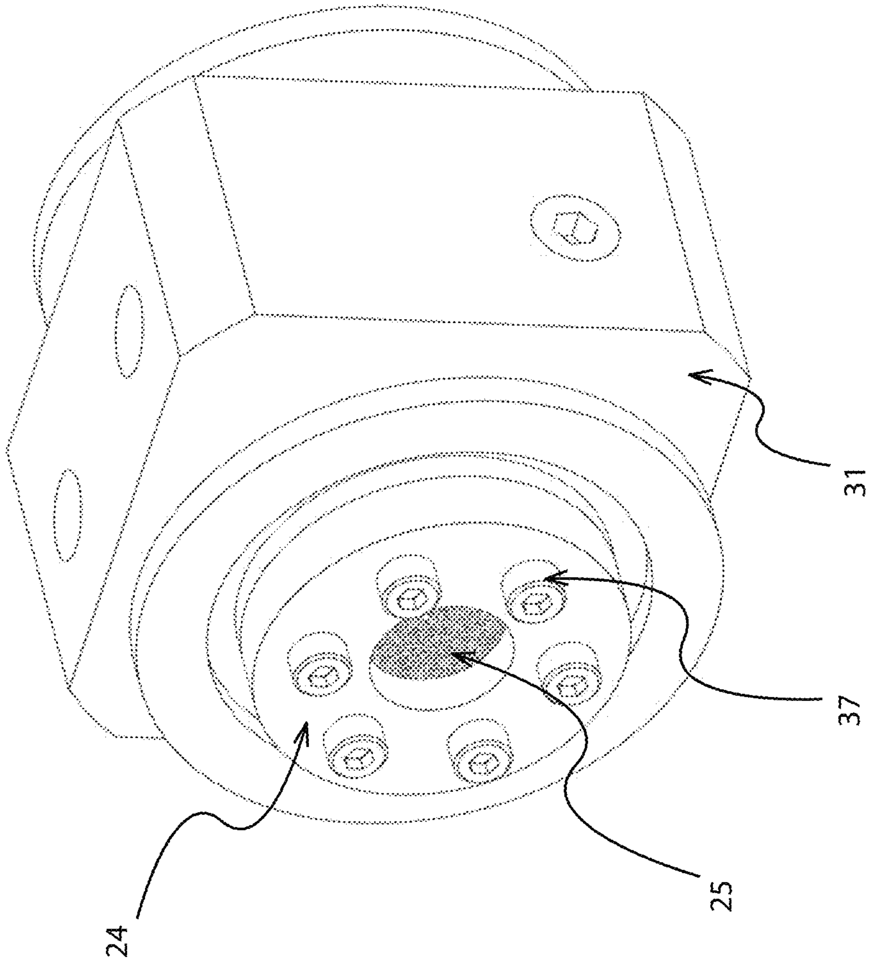
FIG. 8 is an exemplary mounting of the assembly of the single foil separation window according to the present invention.

FIG. 8 show an exemplary mounting of the isolation window according to the present invention when the isolation window assembly, comprising of the holder (24) and the window foil (25) attached to a cooled surface, in this example the body of the beam collimator (31) by fasteners (37). Though the number of fasteners has been described as being six, it is to be understood that any number of fasteners may be utilized.

Figure 9:
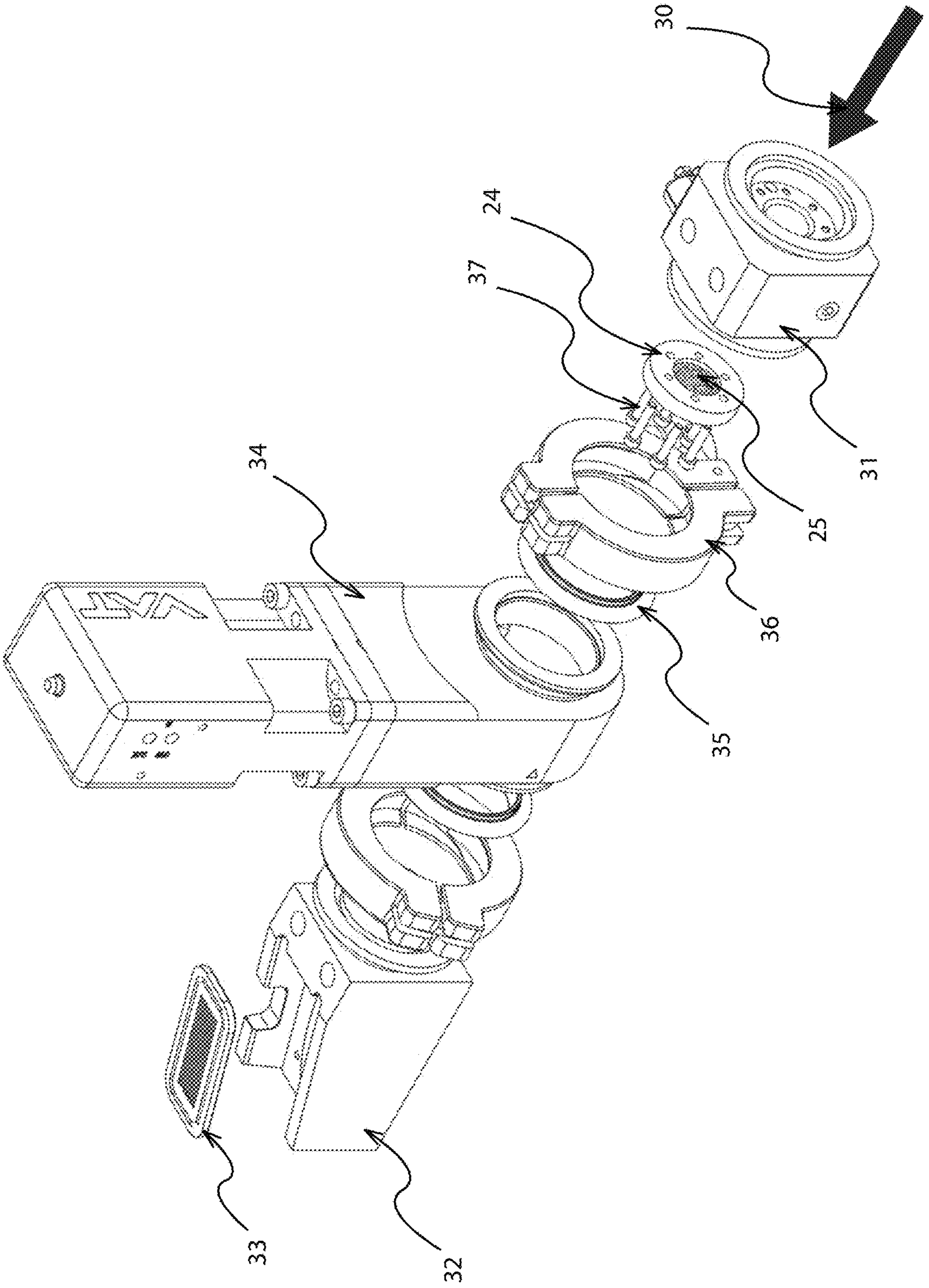
FIG. 9 and FIG. 10 illustrates the exploded view and the cross sectional view of an exemplary solid target irradiation system implementing the single separation window according to the present invention.

FIG. 9 is an exploded isometric view of a possible configuration of the isolation window according to the present invention as can be installed in a target irradiation system. This is a more realistic view of the schematically represented configuration in FIG. 3 and FIG. 4. The irradiation chamber (32) accommodates the target (33). In this example the target is placed at an angle to particle beam and this practice is common in many systems, the aim being the distribution of the beam power over a larger area of the target. The beamline gate valve (34) is attached to the irradiation chamber and the collimator (31) by clamps (36), and provided with the seals (35) maintaining the vacuum integrity. The isolation window holder (24) supporting the window foil (25) is attached to the collimator by the screws (37). The incoming particle beam is indicated by the arrow (30)

Figure 10:
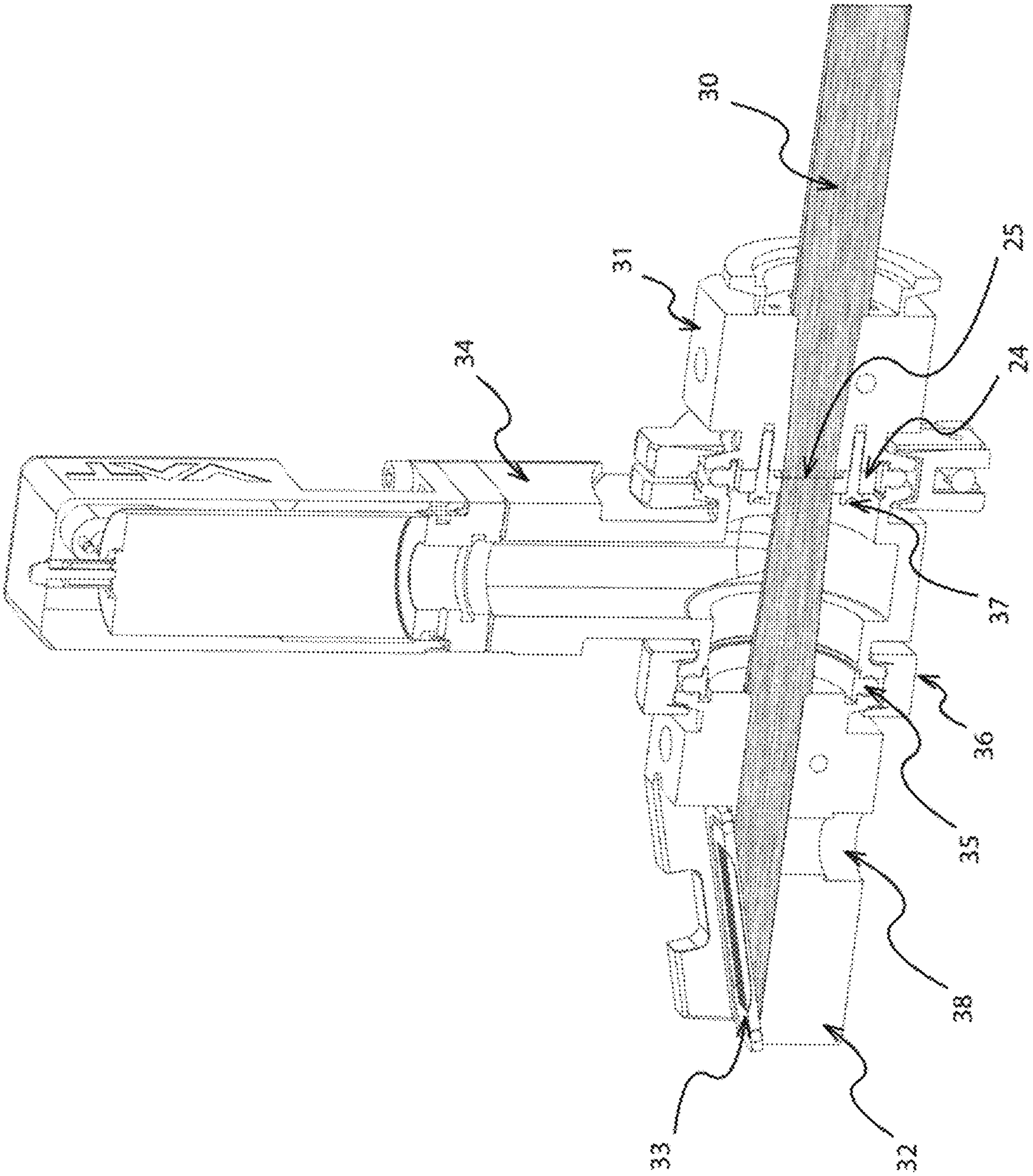

FIG. 10 is a sectional view of the exploded isometric view in FIG. 9 with similar reference characters denote corresponding features consistently in this drawing. The beam (30) passage from the beamline to the target is shown here more realistically as it is moving through the collimator, the window and impending on the target surface. The beam line gate valve (34) is shown here in the open position.

The beam degradation by the isolation foil is best kept to a minimum as in most instances the full energy of the beam is desired to reach the target. The beam energy employed is determined by the nuclear reaction between the target material and beam particles, reaction that is producing the desired radionuclide. In some cyclotrons the beam energy extracted can be varied over a certain energy range; for example in a cyclotron with maximum extracted energy of 30 MeV, the energy can often be tuned to deliver energies in the range of 15 MeV to 30 MeV. However many smaller medical cyclotrons are designed to extract only one fixed, maximum available energy. When a lower energy is required to produce the radionuclide with those cyclotrons, the beam is attenuated, or "degraded" by the introduction of a solid material (degrader) between the beam and the target to absorb a portion of the beam energy. In applications as this, the isolation window can have a dual function of isolating and degrading of the beam—the only difference being the thickness of the window material that in this case can be up to a number of millimeters thick. Thicker window material adsorbs more energy that generates more heat in the window. In this situation the conductive cooling to a cold surface may not be adequate, and the direct cooling of the window holder, as in FIG. 7 can be employed. If employed in this fashion, the whole widow assembly can take the form of a separate, cooled element to be added in front of the beam line valve.

Figure 11:
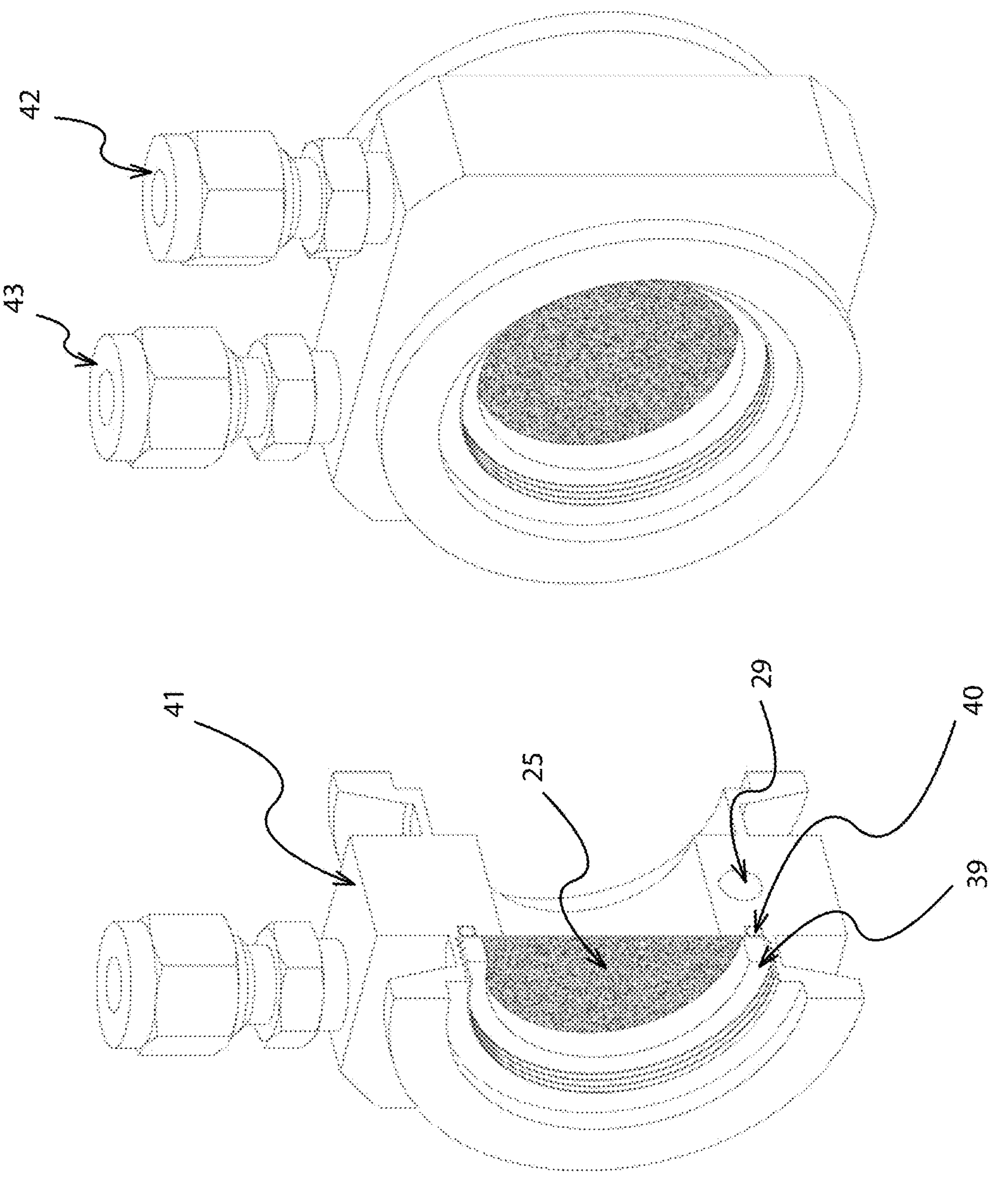
FIG. 11 shows a isometric view and a cross sectional view of another possible construction of the separation window assembly according to the present invention.

FIG. 11 shows an exemplary isolation window acting as isolation window alone, or as a degrader, or as an isolation and degrader combined, but built as an independent, cooled element to be installed in the system. The window element (25), being either a thin foil or thicker wafer, is mounted in the body (41) cooled by an internal cooling channel (29) with the coolant supplied through the tube fittings (42) and discharged through the tube fitting (43). It is to be understood that the supply and discharged assignation here is arbitrary and can be reversed. The body (41) can be formed already having flanges compatible with those used in the system. The window in this exemplary drawing is shown as being clamped to the body by a threaded rating ring (39) and sealed by the seal (40), however any of the previously disclosed methods, or any other attaching and or sealing methods can be used.

Figure 12:
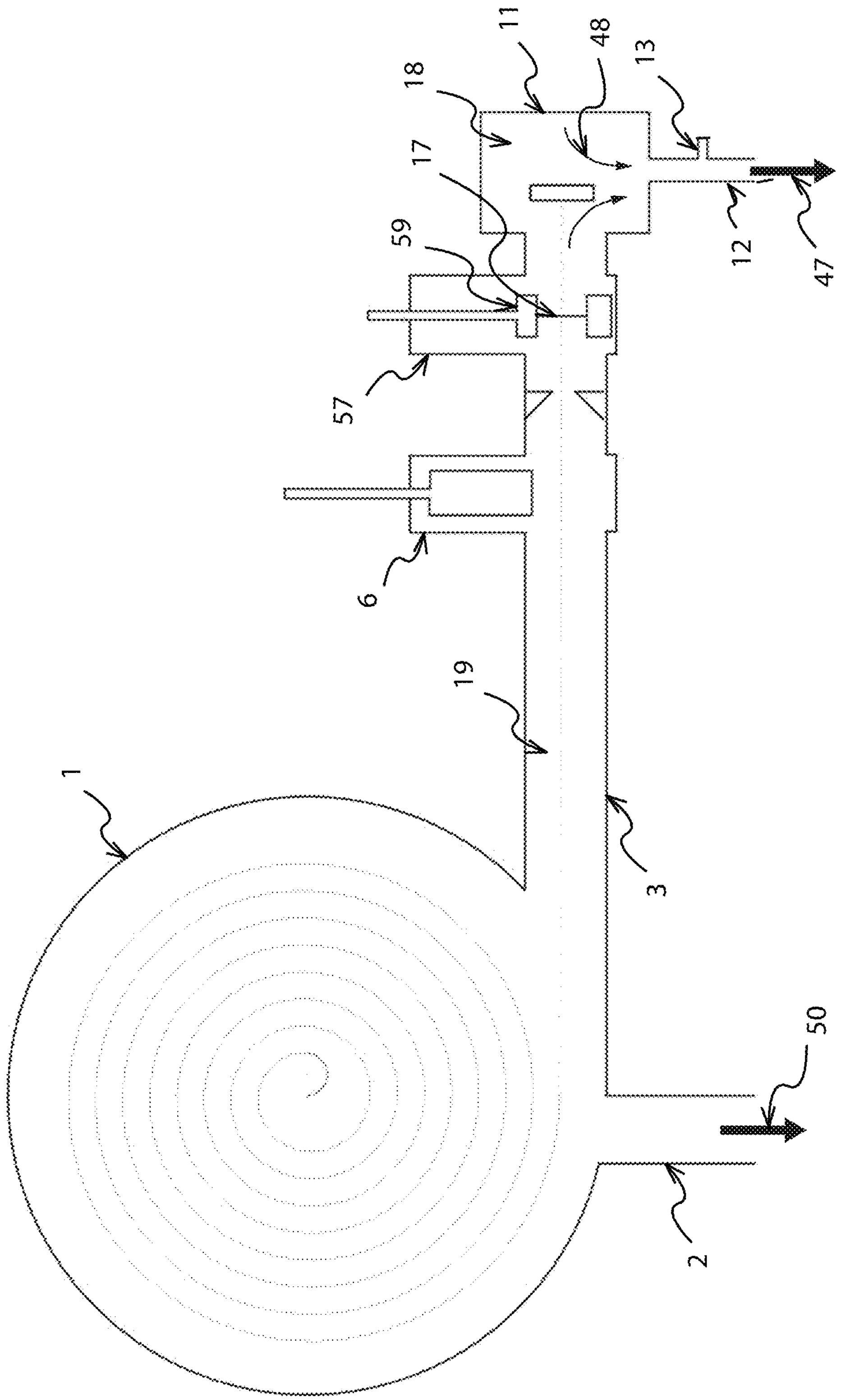
FIG. 12 is a schematic view of an installation with the single foil separation window according to the present invention where the window is mounted on retractable mechanism with the beamline valve opened the evacuated target irradiation chamber.

In some application it is advantageous to be able to move the window out of the way, for example where different target materials not requiring isolation are irradiated in the same target system, or where there is a need for amore frequent access to the window. This can be implemented by mounting the window assembly as shown in FIG. 6 and FIG. 7 on a retractable mechanism. FIG. 12 schematically shows such an arrangement.

FIG. 12 is a schematic view of such an arrangement depicting the target irradiation cycle according to the present invention. The valve (6) shown in the open position and the beam is passing through the window foil (17) to reach the target. The retractable mechanism comprises of an enclosure (57) and an actuator arm with the window assembly (59) attached to it. This mechanism is shown here in the closed position with the window isolating the beamline vacuum (19) from the irradiation chamber vacuum (18). Both the accelerator tank (1) and the beamline (3) are pumped (50) through port (2). The irradiation (11) chamber is pumped as well through the pumping port (12) to maintain the low pressure inside it (18). The flow of the pumped gas is shown by arrows (48). Venting port (13) is closed. The window foil (17) is exposed to the same, very low pressure on both sides with no pressure difference.

Figure 13:
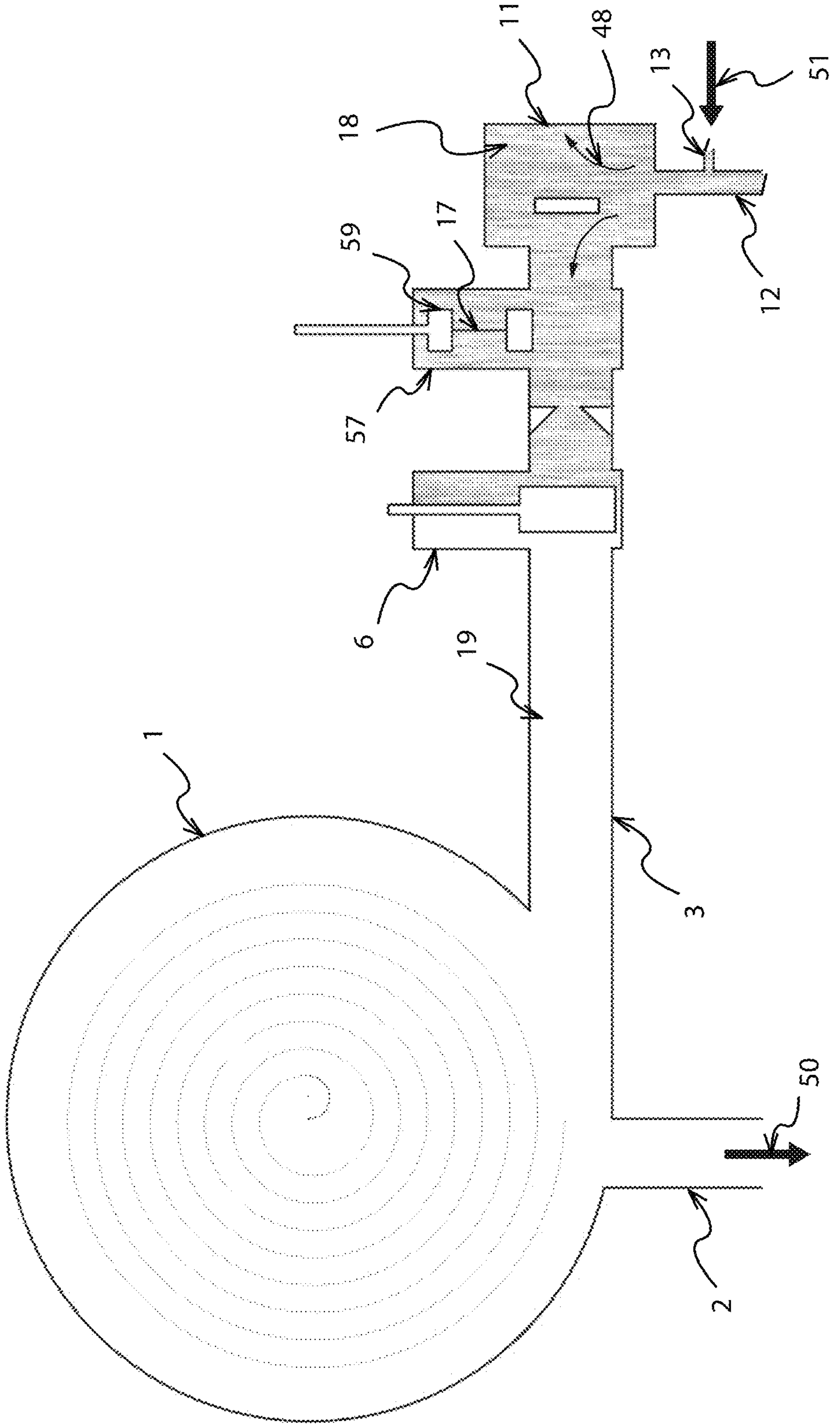
FIG. 13 is a schematic view of an installation with the single foil separation window according to the present invention where the window is mounted on retractable mechanism with the beamline valve closed and vented target irradiation chamber.

FIG. 13 shows the end of irradiation with a system equipped with a retractable window according to the present invention. Once the beam delivery is stopped the beamline valve (6) is closed and the window foil (17) in s the window assembly (59) retracted out of the beamline. Those operations are performed before the venting of the irradiation chamber (11) and with the window still in the vacuum. Once the operation performed, the irradiation chamber is vented through the venting port (13) with venting gas filling (51) flowing (48) into the chamber volume 18 that now includes the volume up to the beam line valve. During the venting and the subsequent reaching of atmospheric pressure, the window foil (17) is expose in its entirety to the irradiation chamber pressure with no pressure difference across the foil.

Figure 14:
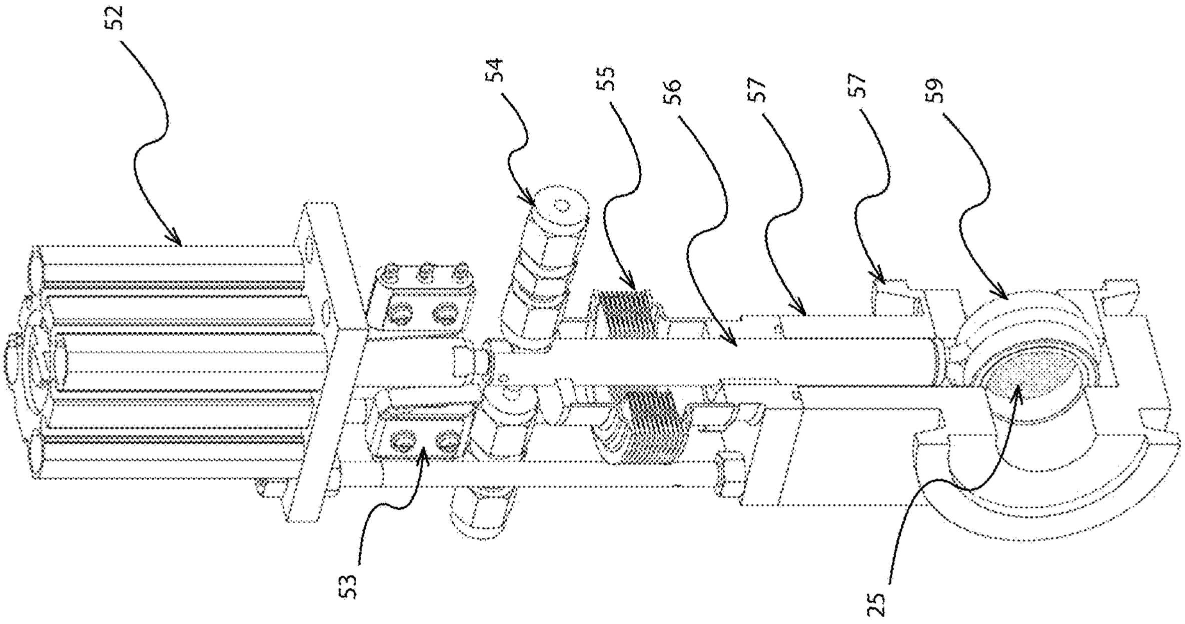
FIG. 14 is a sectional isometric view of a retractable window design according to the present invention.

FIG. 14 is a partial sectional view of a possible retractable window construction. The mechanism housing (57) is hermetically sealed and can be formed with flanges (57) compatible with the existing beamline flanges. Window foil (25) is attached to cooled frame (59) and connected to the manipulator ram (56). This ram can be actuated by an actuator, shown here as pneumatic cylinder (52), but can be electrically or in other way operated. The linear movement of the ram is sealed by bellows (55) with the coolant delivered to the frame (59) by tubes inside the ram and delivered through the fitting (54). If needed, the in and out of state the window can be detected through limit switches (53). Though mechanical switches are shown, those can be other form of limit or proximity sensors. In fact, the construction here is similar to a gate valve construction with the gate comprising of the window that provides a hermetic seal.

The portion of the beam current absorbed by the window foil, combined with the secondary electron emission from the foil caused by the collisions of the foil atoms with the beam particles, creates an electrical current in the window. When the window is attached to any part of the irradiation system or the beamline, this current is conducted to the usually grounded elements of the system. The window frame can, however, be mounted in a way as to electrically insulate it from the supporting element. When insulated in this way, the electrical current can be monitored by measuring the current flow to ground. The current can be an indication of the window integrity, with a drop in current indicating a possible hole in the foil (less beam intercepted) or a total absence of beam in a destructive failure of the window foil. If detected, the irradiation can be stopped and the beam line valve closed to prevent the ingress of contaminates to the beamline.

Figure 15:
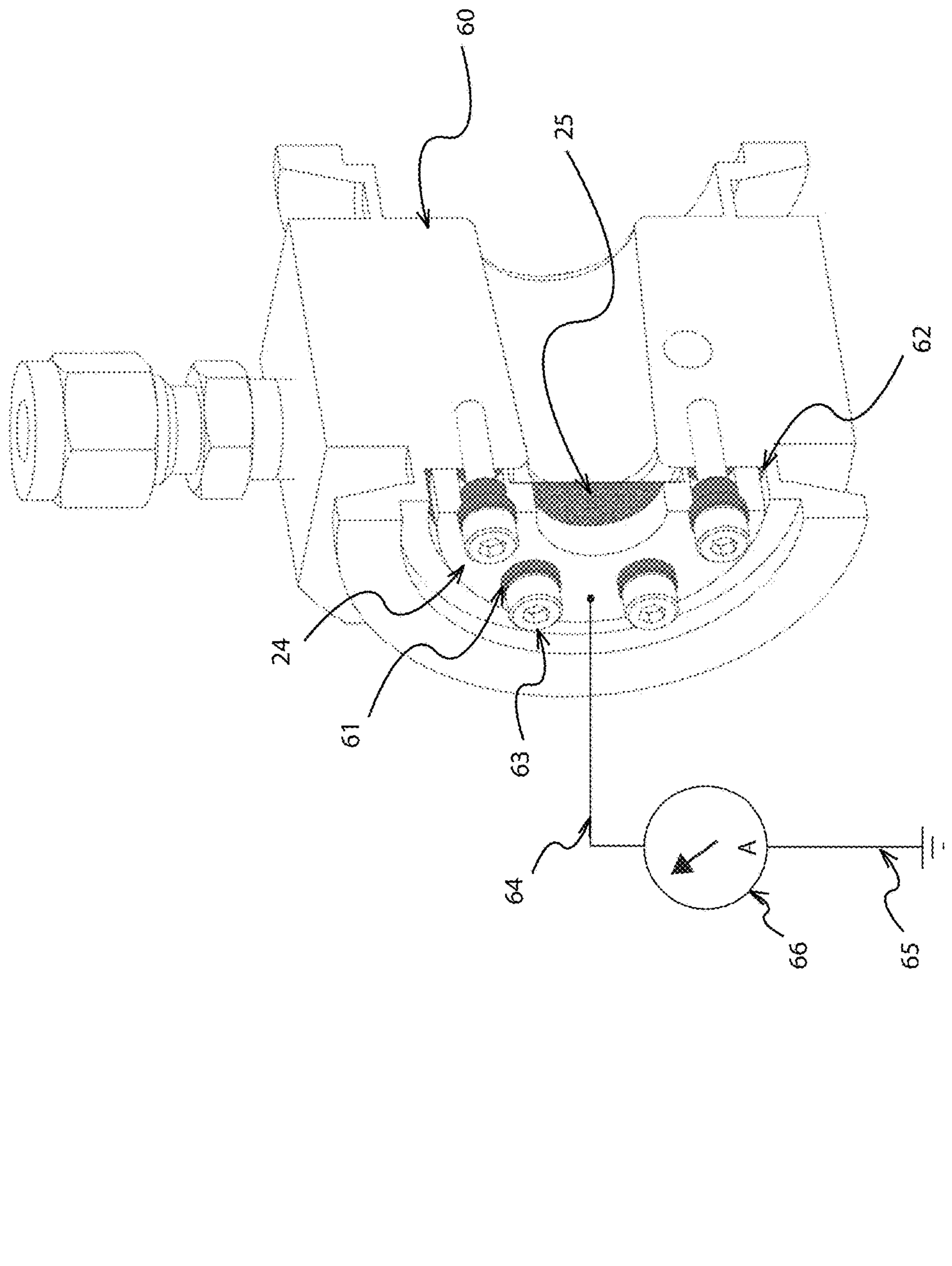
FIG. 15 shows a method for monitoring the window foil integrity by the measurement of the current generated through the passage of the particle beam through the window foil Unless otherwise indicated, similar reference characters denote corresponding features consistently throughout the attached drawings.

Such possible arrangement is shown in FIG. 15. Here the window foil (25) is mounted on the frame (24) that is attached to a cooled body (60)—in this case a collimator as shown in FIG. 8. and FIG. 9, however the screws (63) are insulated by insulating washers (61) and the frame (24) itself insulated from the body (60) by a thin insulating (and of good thermal conductivity) barrier (62). The electrical current generated in the foil is conducted to the frame and connected by a conductor (64) to a current measuring or sensing device (66) flowing to ground through the conductor (65).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

What is claimed is:

1. An isolation window for isolating a target from a beamline of an accelerator, comprising:

a single thin foil of impermeable-to-air-and-gases material, attached to a supporting frame to be vacuum tight, wherein the supporting frame is mounted on the beamline so that the foil is placed in a beam path upstream from the target in such a way that the foil is not exposed to any pressure difference during all stages of manipulation and irradiation of the target.

2. The isolation window of claim 1, wherein the foil has a thickness in the range of 1 to 5 micrometers.

3. The isolation window of claim 1, wherein the foil and the supporting frame are each constructed of a thermally conductive material.

4. The isolation window of claim 3, wherein the foil is constructed of a material having a thermal conductivity of at least 200 $W \cdot m^{-1} \cdot K^{-1}$.

5. The isolation window of claim 3, wherein the supporting frame is constructed of a material having a thermal conductivity of at least 100 $W \cdot m^{-1} \cdot K^{-1}$.

6. The isolation window of claim 3, wherein the foil is cooled only through conduction without surface gas cooling.

7. The isolation window of claim 3, wherein the foil is connected to the supporting frame to be vacuum tight while providing thermal conductivity to the frame.

8. The isolation window of claim 1, wherein the foil and the supporting frame are cooled by at least one of conduction to a cooled surface and direct cooling by a coolant flow through internal-to-the-supporting-frame cooling channels or channels attached to the supporting frame.

9. The isolation window of claim 1, wherein the supporting frame with the foil is upstream of a beamline valve that, in a closed position, provides a vacuum tight seal between the beamline and an irradiation chamber.

10. The isolation window of claim 1, wherein the supporting frame is mounted on a retractable mechanism that, in a retracted position, exposes both sides of the foil to a same environment and, in a sealed position, provides a vacuum tight seal between an environment upstream of the foil and an environment downstream of the foil.

* * * * *